INVENTORS
RONALD A. HOWARD
ARNOLD A. KELLAR
JOSEPH T. MEERS

BY John S. Piscitello

ATTORNEY

United States Patent Office 3,439,073
Patented Apr. 15, 1969

3,439,073
METHOD OF MANUFACTURING FUEL ELEMENTS
Ronald A. Howard and Arnold A. Kellar, Lawrenceburg, Tenn., and Joseph T. Meers, Cleveland, Ohio, assignors to Union Carbide Corporation, a corporation of New York
Continuation-in-part of application Ser. No. 388,267, Aug. 7, 1964. This application Dec. 15, 1966, Ser. No. 602,054
Int. Cl. C21c 21/02
U.S. Cl. 264—.5   8 Claims

ABSTRACT OF THE DISCLOSURE

A process for making nuclear fuel elements having a fueled core and an unfueled rigid graphite exterior shell which comprises the steps of preparing a fueled core mixture containing a nuclear fuel material, a high temperature matrix material, expanding graphite and a carbonizable binder; incorporating said mixture within a rigid graphite shell; heating the resulting composite when a thermosetting binder is employed to cure the binder, and then baking the composite at a temperature sufficient to carbonize the binder and expand the expanding graphite.

The use of expanding graphite in the core of the fuel element provides for continuous contact between the core and outer graphite shell by overcoming the shrinkage which occurs when the fueled core is placed in the solid graphite exterior shell and baked to carbonize the binder.

---

This application is a continuation-in-part of application Ser. No. 388,267, entitled "Fuel Elements," filed Aug. 7, 1964 and now abandoned.

This invention relates to solid nuclear fuel elements and to the construction of nuclear fuel elements. More particularly, this invention relates to a fuel element having a fueled core comprising a fisisonable material disposed in a matrix and having an unfueled carbonaceous cover.

Fission is a process in which the nucleus of a heavy element such as uranium or plutonium, is split into two fragmentary parts by a neutron which functions somewhat like a projectile. A neutron has no charge and can easily pentrate into the nucleus of a heavy element. The presence of this particle, however, causes the heavy element to become unstable and to split into two fragmentary products. In the process, several additional neutrons are released which, in turn, cause other nuclei to undergo fission and this results in a chain reaction. The total mass of the nucleus of the fragmentary products is always less than that of the original reactant and the difference in mass is converted to energy of motion of the fragmentary products, resulting in heat being produced. This heat can be continuously removed by the passage of a coolant through the core of the reactor and may be used as a source of energy. The fission reaction, when viewed on an overall basis, is one of the most efficient sources of energy known today.

Heavy element-containing materials suitable for use as fuels in nuclear fission reactors are well known. For example, there can be utilized as solid nuclear fuels uranium-containing, or plutonium-containing materials or substances such as the oxides of uranium e.g., uranium dioxide ($UO_2$), uranic oxide ($UO_2O_3$) etc., and the carbides of uranium e.g., uranium dicarbide ($UO_2$) and uranium monocarbide ($UC$); thorium-containing materials such as thorium (Th), the carbides of thorium e.g., thorium dicarbide ($ThC_2$) and thorium monocarbide ($ThC$) and the oxide of thorium ($ThO_2$). The solid nuclear fuels may comprise one or more uranium-containing materials or one or more thorium containing materials or a mixture of uranium-containing material and thorium-containing material e.g., a mixture of thorium dioxide and an oxide of uranium or a mixture of thorium dicarbide and uranium dicarbide. The uranium- and/or thorium-containing material may be admixed with a material such as zirconium carbide (ZrC), niobium carbide (NbC) or the like which will impart chemical and temperature stability to the fuel. Although thorium is not a fissionable material, when bombarded by neutrons it changes into uranium becoming fissionable and thus a source of nuclear energy. Therefore, whenever the expression "nuclear fuel" is used in the specification and claims it is intended to include non-fissionable materials such as thorium-containing materials which, when bombarded by neutrons, are transformed into fissionable materials as well as materials which undergo fission under the influence or impact of neutrons.

The usefulness of many solid nuclear fuels is somewhat curtailed, in many cases, by the fragmentary products that are produced during the fission proces as heretofore described. These fragmentary products possess both a high degree of radioactivity and a high degree of kinetic energy. They are capable of penetrating a number of materials resulting in a change of crystal structure, tensile strength, and many other properties of the materials. Thus, the presence of these fragmentary products will often restrict the final design and structure of the reactor in the vicinity of the core. Also, these fragmentary by-products quite often contaminate the coolant as it circulates through the reactor and associated equipment. Consequently, fuel particles are often clad or coated with aluminum oxide, pyrolytic carbon, or some other material which will reduce the rate of release of fission products during reactor operation and provide safeguards for handling fuel elements during fabrication and subsequent handling.

When the fuel elements of a nuclear reactor are to be maintained at elevated operating temperatures, it is important that the fuel elements be mechanically strong and have uniform energy producing and heat transmitting properties. These requirements are important in order that the fuel element provide optimum conduction of heat without the development of isolated areas of elevated temperatures and uniform retention of radioactive materials and fission products.

Heretofore, fuel elements have been made by mixing a nuclear fuel with some suitable high temperature matrix material, e.g., graphite, beryllium, beryllium oxide, aluminum oxide and the like, and some suitable binder such as pitch or tar, pressing the resulting admixture into the desired shape or form and then baking the formed fuel element. During fabrication of such fuel elements some of the nuclear fuel material becomes located at or near the surface of the fuel element. Since the surface of the fuel element is subject to considerable mechanical abrasion during loading and operation of the reactor, the surface of the fuel element, and consequently the fuel particles, may be easily chipped and damaged. Such damage obviously leads to loss of fuel material, and escape of fission products. The ultimate result, of course, is contamination of the reactor coolant and associated equipment, danger to those handling the fuel elements, and loss of energy producing capability.

Damage to the fuel elements and resulting dangers can be overcome at least in part by providing a protecting cover or cladding for the fuel element. Nuclear fuel elements are customarily clad or enclosed within a coating of some suitable metal, ceramic, cermet, carbide, graphite or a combination of these materials. To date, the practice of cladding fuel elements has been found a difficult and costly though necessary practice. Most commonly employed cladding materials possess one or more disadvantageous characteristics which limit or circumscribe the general applicability of the material. Metal claddings impose an upper temperature limit on the reactor system, the upper limit being the metallurgical limit of the cladding metal. Cermet and ceramic coatings, while providing for higher operating temperatures, usually fail or rupture as a result of temperature or radiation induced volume and phase changes. Moreover, such materials usually have low tensile strength, low thermal conductivity, or brittleness.

One means for providing a fuel element comprising a fueled core and a protective coating or sheath is to provide a hollow spherical carbonaceous structure which is filled with a suitable nuclear fuel-matrix-binder admixture. The resulting composite can be conveniently referred to as a fuel element having a fueled core and an unfueled exterior cover.

The term "carbonaceous" is intended to encompass both carbon and graphite. The term "fueled core" relates to the mixture of a nuclear fuel material and a suitable matrix together with a suitable binder, which makes up the center of a fuel element. The term "fuel element" relates to the composite unit comprising a fueled core and a suitable exterior shell.

The spherical cover member can be conveniently prepared by machining out the center of a carbonaceous sphere, or by hollowing out the centers of matching hemispheres, so as to form concave members which can be filled with the fuel core material. Alternatively, suitable molding techniques can be employed to provide concave members directly, without the necessity of machining out the necessary portions. The thickness of the outer shell will be dictated by the requirements of the reactor system.

The aperture through which the fueled core mixture is introduced into a hollowed out sphere can be easily closed by means of a plug machined to slip or be threaded into the aperture.

The fueled core mixture is prepared by any convenient blending and formulating technique known in the art. Broadly a nuclear fuel material is blended with a high temperature matrix and a binder in such proportions as are required to provide convenient handling and forming of the fuel element.

The fueled core mixture is introduced into the protective cover or shell under pressure sufficient to provide the desired density. Heat is generally supplied to cure any thermosetting binders employed. Then the composite fuel element is baked to carbonize the binder and provide the final product.

Unfortunately, when a rigid cover is used the baking operation generally results in separation of the fueled core from the outer cover. During baking the volatile materials in the fueled core mixture are driven off, the binder is carbonized and there is a resulting decrease in volume. Since the outer cover is a rigid previously baked carbonaceous member, it undergoes no such change in volume. The separation of the fueled core from the outer cover is detrimental to the performance of the fuel element. The gap between the fueled core and the cover reduces the transfer of heat from the fueled core and greatly reduces the compressive strength of the fuel element.

It is an object of this invention to provide a fuel element comprising a rigid outer cover which surrounds and is intimately bonded to a fueled core.

It is a further object to provide a mechanically strong fuel element having a fueled core and a rigid outer graphite shell.

It is a still further object to provide a fuel element having a rigid outer shell and a fueled core which has improved thermal conductivity between said outer shell and said fueled core.

It is another object to provide a fuel element having a structure which facilitates heat transfer from the fueled core to the graphite shell.

It is still another object of the invention to provide a method for making the herein-described fuel elements, thereby achieving the objects and advantages described.

These and other related objects are achieved through the use of expanding graphite in the construction and fabrication of the fuel element.

It has been found that certain graphites having a high degree of orientation such as, for example, natural graphites, kish graphite and artificial graphites, for instance, heat treated pyrolytic graphites can be treated so that the spacing between the superposed layers or laminae can be appreciably opened up so as to provide a marked expansion in the direction perpendicular to the layers, that is, in the $c$ direction and thus form an expanded or intumesced graphite structure in which the laminar character is substantially retained.

In U.S. Patents 1,137,373 and 1,191,383 natural graphite in the form of flake or powder of a size too great to pass through a 200 mesh screen is expanded by first subjecting the graphite particles for a suitable period of time to an oxidizing environment or medium maintained at a suitable temperature. Upon completion of the oxidizing treatment, the soggy graphite particles or masses are washed with water and then heated to between about 350° C. and 600° C. to fully expand the graphite particles in the $c$ direction. The oxidizing mediums disclosed are mixtures of sulfuric and nitric acids and mixtures of nitric acid and potassium chlorate.

The term "expanding graphite," as used herein, refers to a graphite material which has been treated so as to render it capable of expansion upon heating at a temperature above 350° C. To make expanding graphite the washing step is followed by drying at a temperature below which expansion actually takes place. Subsequent heating or baking at proper temperatures results in expansion and the final product is referred to as "expanded graphite."

By the above treatment, expansions of the natural graphite particles of up to about 25 times the original bulk were obtained. There is also disclosed that the expanded natural graphite can be compounded with a binder, e.g., a phenolic resin and the resultant composition compressed or molded into various forms, such as discs, rings, rods, sheets, and the like.

The use of expanding graphite overcomes the shrinkage of the fueled core and provides for continuous contact between the fueled core and the outer shell. By eliminating the gap between the fueled core and the shell, heat transfer is enhanced and performance of the fuel element is improved as well as its mechanical strength and physical integrity.

The expanding graphite can be incorporated directly into the admixture which constitutes the fueled core. The amount of expanding graphite employed depends on the normal shrinkage of the particular fueled core mixture which is employed. Shrinkage is primarily dependent on the nature of and amount of binder in the mixture. In general, satisfactory results have been obtained with from 1 to 20 weight percent of expanding graphite based on the weight of non-fuel components. If too much expanding graphite is used, the internal pressure will be excessive and result in rupturing of the rigid outer shell.

Alternatively, the surface of the cavity of the carbonaceous shell can be coated with a carbonaceous cement comprising sufficient expanding graphite to compensate for the shrinkage of the fuel core.

In many instances when long term thermal cycling is anticipated it may be advantageous to employ both an expanding graphite cement and a fueled core comprising expanding graphite. Bonding between the outer shell and the fueled core is thereby greatly enhanced.

Suitable expanding carbonaceous cements comprise finely divided carbon or graphite, a carbonizable resin, and expanding graphite in proportions which are suitable to provide a strong carbonaceous bond between the fueled core and the rigid graphite shell after baking. A specific formula for an expanding graphite cement comprises about 48.4 weight percent each of artificial graphite and a liquid phenolic resin, e.g., a furfural-phenolic resin, and about 3.2 weight percent expanding graphite.

In the practice of this invention a mixture comprising a suitable high temperature matrix material, nuclear fuel particles, expanding graphite and a carbonizable binder is molded into a hollow graphite sphere. Heat is then applied to cure the binder. When the binder has been properly cured, the fuel element is baked and the binder carbonized or graphitized and the expanding graphite is simultaneously expanded. The final fuel element is a unitary composite comprising a fueled core and an outer shell having no separation between them.

Suitable carbonizable binders include epoxies, phenolics, furfural alcohol, or coal tar pitches. In general binders having a coking valve of 40% or greater are preferred.

In a preferred embodiment a matrix mixture comprising about 80 weight percent graphitized petroleum coke, 3 to 8 weight percent expanding graphite, 12 to 22 weight percent carbonizable binder, all based on the total weight of the matrix mixture, is prepared and blended with a specified amount of nuclear fuel material. The actual amount of nuclear fuel material employed will depend on the specifications to which the finished fuel element must conform. The resulting blend is then molded into a hollow graphite sphere under low molding pressures of less than 1000 pounds per square inch. If a thermosetting resin binder is used the molded sphere is then heated to about 100° C. to cure the binder. The resin can be cured under pressure or if desired the molding pressure can be released prior to cure. The fuel element is then baked to carbonize the binder and expand the expanding graphite. During baking the temperature is raised about 200° C. per hour to a maximum temperature of between 1000° C. and 2000° C. The maximum baking temperatures employed are limited by the decomposition temperature of the nuclear fuel material.

In preparing the fueled core mixture it is essential that the nuclear fuel material be uniformly distributed throughout the mixture. In general any blending or mixing technique capable of providing uniform dispersion of the nuclear fuel material throughout the mixture is suitable. One method which has been found to provide a uniform mixture comprises mixing the binder and about one-fifth of the matrix material to provide a binder rich admixture. The nuclear fuel material is then blended into this binder rich admixture. Then the balance of the matrix material and the expanding graphite is added and the entire mixture is blended for a period of time sufficient to provide uniform dispersion of the ingredients. In general, it is desirable to add the expanding graphite as the last ingredient, so that the expanding properties are not substantially reduced by any physical damage to the expanding graphite particles caused by abrasion and working of the particles.

Example I

Figure 1:
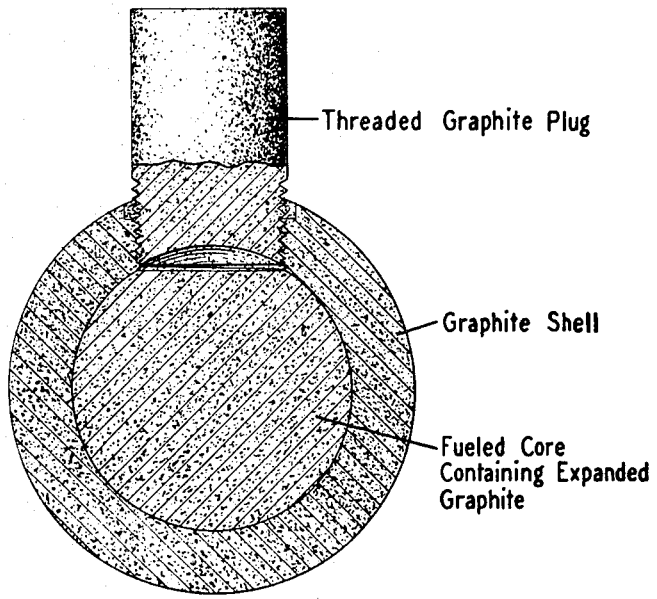
FIGURE 1 is a fuel element comprising a hollow spherical graphite shell filled with a fueled core mixture containing expanded graphite and having a threaded aperture sealed with a threaded plug.
Figure 2:
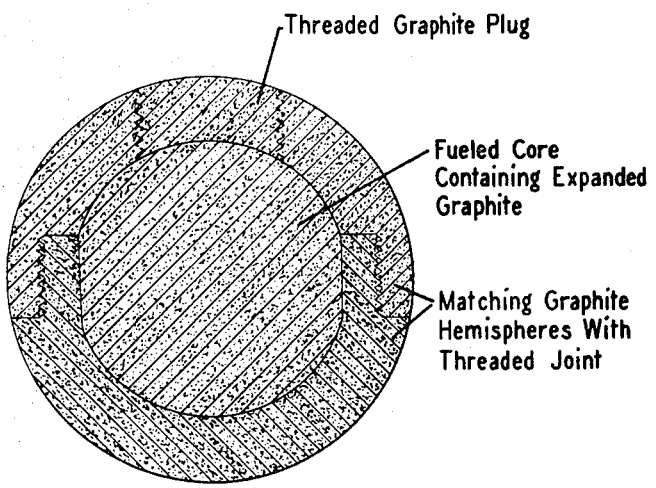
FIGURE 2 is a fuel element comprising a hollow spherical graphite shell having matching graphite hemispheres fitted together with a threaded joint and filled with a fueled core mixture containing expanded graphite and having a threaded aperture sealed with a threaded plug machined to the curvature of the sphere.

A fuel element having a fueled core comprising a nuclear fuel material and non-nuclear fuel constituents is made by blending the components to form a uniform admixture. The non-nuclear fuel portion comprises about 80 weight percent sized artificial graphite, about 4 weight percent expanding graphite and about 16 weight percent of a liquid furfural-phenolic resin. The fueled core contains the above-described formulation and about 25 grams of pyrolytic carbon coated particles of uranium carbide in a uniform blend. The blend is then molded into a 4.4 centimeter diameter cavity of a graphite sphere which has a 6 centimeter diameter.

Example II

A fueled core mixture was prepared by blending the constituent materials in the following manner.

A carbonizable liquid resin was added cold into a suitable mixer and one-fifth of the artificial graphite added thereto and blended to provide a resin rich mixture. Then a sufficient amount of pyrolytic carbon coated uranium carbide particles to provide about 25 grams of such particles for each sphere was added and blended with the resin rich mixture. Then the balance of the artificial graphite was added and blended. The expanding graphite was added last and the total mixture blended for about one hour.

Example III

A fuel element comprising a fueled core and an unfueled outer shell was prepared in the following manner. A mixture comprising 45.10 grams of sized purified artificial graphite, 1.81 grams of purified expanding graphite, 9.02 grams of furfural-phenolic liquid resin, and 24.20 grams of pyrolytic carbon coated particles of uranium dicarbide was prepared by blending one-fifth of the artificial graphite with the liquid resin in a cold mixer. The pyrolytic carbon coated fuel particles and the balance of the artificial graphite were added to the running mixer. Then the purified expanding graphite was introduced into the mixer while still running. The resulting admixture was blended for about 30 minutes. An 80.1 gram portion of the blended admixture was then weighed out and forced into a hollow graphite sphere through a threaded aperture under a pressure of about 300 pounds per square inch. The threaded aperture was then sealed with a threaded plug coated with an expanding graphite cement, comprising 48.4 weight percent artificial graphite, 48.4 weight percent furfural-phenolic liquid resin and 3.2 weight percent expanding graphite. The sphere was then cured at 100° C. for 8 hours, after which the top of the plug was machined to the curvature of the sphere. The sphere was then baked to 1450° C. by raising the temperature from 50° C. to 500° C. at a rate of 130 degrees per hour, and from 500° C. to 1450° C. by raising the temperature 250 degrees per hour. The temperature was held at 1450° C. for 30 minutes.

What is claimed is:
1. The method of making a fuel element for use in a nuclear reactor which comprises;
  (a) making a mixture for the fuel core which includes a nuclear fuel material, a suitable high temperature matrix material and expanding graphite and a carbonizable binder;
  (b) molding said mixture within a rigid graphite exterior shell, and heating the molded unit when a thermosetting binder is employed to cure the binder;
  (c) baking the molded unit to a temperature sufficient to carbonize the binder and expand the expanding graphite.
2. The method as in claim 1 wherein the binder is a thermosetting binder.
3. The method of making a fuel element for use in a nuclear reactor which comprises;
  (a) making a mixture comprising sufficient quantity of a high temperature matrix material, from about 1 to about 20 weight percent expanding graphite, and from about 12 to about 22 weight percent of a carbonizable binder;
  (b) blending with said mixture a selected amount of a nuclear fuel material;

(c) molding the resulting blended admixture within a graphite shell at a pressure between 200 and 300 pounds per square inch;
(d) heating the resulting molded unit when a thermosetting binder is employed at a temperature sufficient to cure the binder;
(e) and then baking the molded unit at a temperature between 1000° C. and 2000° C. to carbonize the binder and expand the expanding graphite.

4. The method as in claim 3 wherein the binder is a thermosetting binder.

5. In a process for making nuclear fuel elements having a fueled core and an unfueled graphite shell which comprises the steps of preparing a fueled core mixture containing a nuclear fuel material, a high temperature matrix material and a carbonizable binder; incorporating said mixture within a graphite shell; heating the resulting composite when a thermosetting binder is employed to cure the binder, and then baking the composite at a temperature sufficient to carbonize the binder; the improvement which comprises employing expanding graphite as a constituent of the fueled core mixture in amounts sufficient to prevent separation of the fueled core from the graphite shell during baking.

6. The method as in claim 5 wherein the binder is a thermosetting binder.

7. In a process for making nuclear fuel elements having a fueled core and an unfueled graphite exterior shell which comprises the steps of preparing a fueled core mixture containing a nuclear material dispersed throughout a high temperature matrix and a carbonizable binder; incorporating said mixture within a graphite exterior shell; heating the resulting composite when a thermosetting binder is employed to cure the binder, and then baking the composite at a temperature sufficient to carbonize the binder; the improvement which comprises employing expanding graphite as a constituent of the fueled core mixture in amounts sufficient to compensate for shrinkage of the fueled core upon carbonization of the binder.

8. The method as in claim 7 wherein the binder is a thermosetting binder.

References Cited

UNITED STATES PATENTS

| 3,212,989 | 10/1965 | Fitzer et al. | 176—71 |
| 3,260,651 | 7/1966 | Gress et al. | 176—90 |
| 3,284,314 | 11/1966 | Rachor et al. | 176—90 |

CARL D. QUARFORTH, *Primary Examiner.*

MELVIN J. SCOLNICK, *Assistant Examiner.*

U.S. Cl. X.R.

264—29; 176—67, 69, 90, 91